(12) United States Patent
Alaze

(10) Patent No.: US 6,520,756 B1
(45) Date of Patent: Feb. 18, 2003

(54) PISTON PUMP

(75) Inventor: Norbert Alaze, Markgroningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,469

(22) PCT Filed: May 4, 2000

(86) PCT No.: PCT/DE00/01428
§ 371 (c)(1),
(2), (4) Date: Jul. 26, 2001

(87) PCT Pub. No.: WO01/00990
PCT Pub. Date: Jan. 4, 2001

(30) Foreign Application Priority Data

Jun. 24, 1999 (DE) .......................................... 199 28 913

(51) Int. Cl.[7] ........................... F04B 23/00; F04B 41/00

(52) U.S. Cl. .................. 417/441; 417/540; 137/115.01

(58) Field of Search ................................. 417/441, 540, 417/542, 569, 523, 541; 137/109, 115.01, 115.06, 115.15

(56) References Cited

U.S. PATENT DOCUMENTS

| 5,123,819 A | * | 6/1992 | Schuller et al. ............. 417/569 |
| 5,172,956 A | * | 12/1992 | Klose et al. ............. 303/116.4 |
| 5,199,860 A | * | 4/1993 | Stegmaier .................... 417/566 |
| 6,079,961 A | * | 6/2000 | Schuller et al. ............. 417/549 |
| 6,082,244 A | * | 7/2000 | Siegel et al. .................... 92/78 |
| 6,093,003 A | * | 7/2000 | Hauser et al. ............. 417/541 |
| 6,142,037 A | * | 11/2000 | Botosan et al. ........... 74/606 R |
| 6,283,733 B1 | * | 9/2001 | Merklein et al. ........... 417/549 |
| 6,334,762 B1 | * | 1/2002 | Hauser et al. .............. 417/569 |

FOREIGN PATENT DOCUMENTS

| DE | WO 97/13667 | * | 4/1997 |
| DE | WO 99/06707 | * | 2/1999 |
| DE | 197 32 791 A1 | * | 2/1999 |

* cited by examiner

Primary Examiner—Cheryl J. Tyler
Assistant Examiner—Han L. Liu
(74) Attorney, Agent, or Firm—Ronald E. Greigg

(57) ABSTRACT

The invention relates to a piston pump for a vehicle brake system, in particular a slip-controlled hydraulic vehicle brake system. For damping pressure pulsations, the invention proposes proving a throttle, as a place of narrowed cross section, in an outlet conduit of the piston pump.

Figure 1:
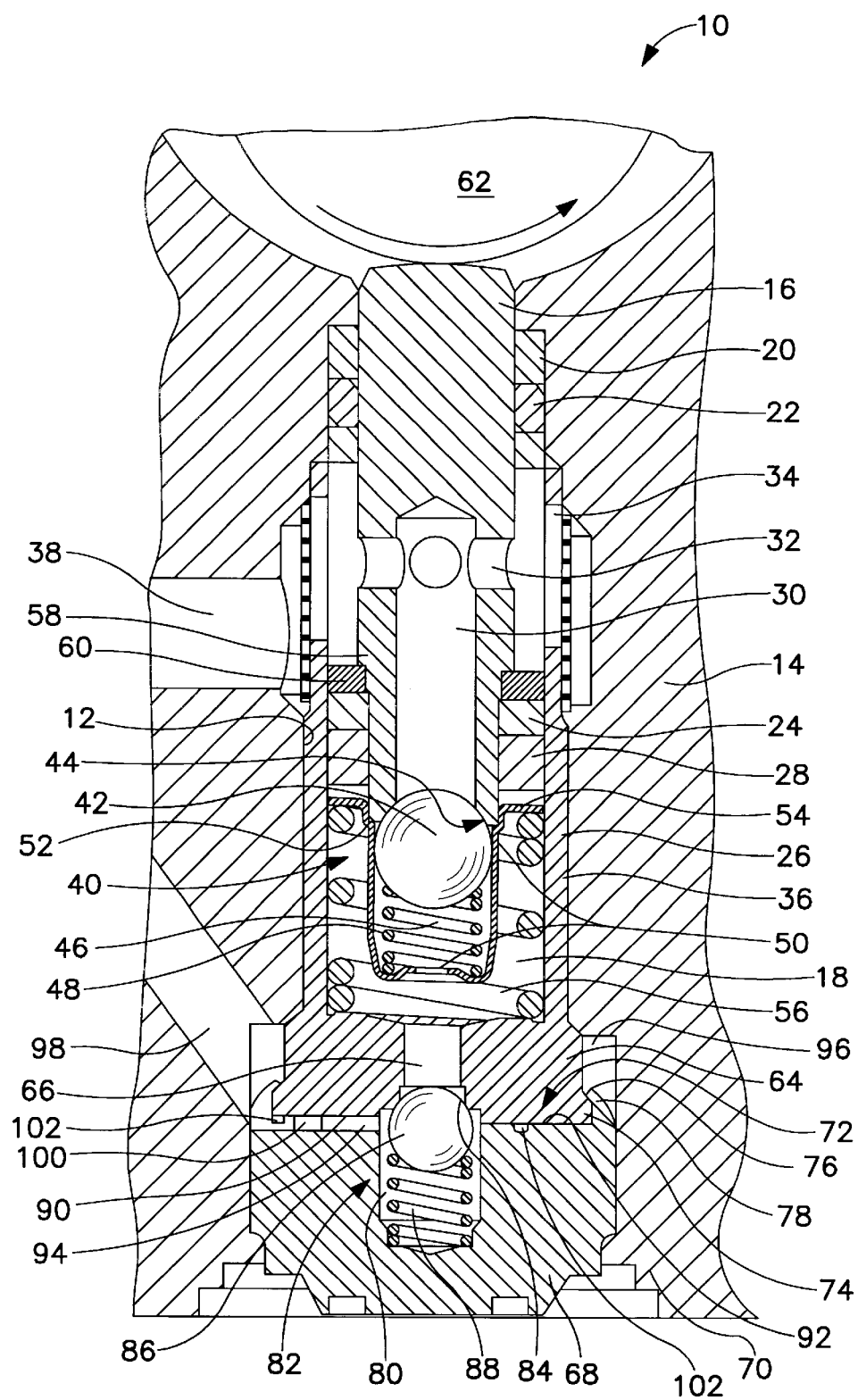

10 Claims, 2 Drawing Sheets ized by the preamble to the main claim, which is provided in particular for a hydraulic vehicle brake system.
PISTON PUMP

PRIOR ART

The invention relates to a piston pump as generically defined by the preamble to the main claim, which is provided in particular for a hydraulic vehicle brake system.

One such piston pump is known from German Patent Disclosure DE 197 32 791 A1. The known piston pump has a pump bore, which is mounted in a hydraulic block that forms a pump housing. A piston is guided axially displaceably in the pump bore. In the known piston pump, a bush is inserted into the pump bore, and the piston is axially displaceably guided in the bush. It is equally possible to guide the piston axially displaceably in the pump bore in the pump housing directly, leaving out the bush. By mean of an eccentric element, which is disposed on one face end of the piston and is drivable to rotate, the piston can be driven to execute a reciprocating stroke motion in the axial direction in the pump bore, and this motion in a manner known per se brings about the pumping of fluid.

As disclosed in German Patent Disclosure DE 42 26 646 A1, for example, such piston pumps are typically followed hydraulically by a damper chamber and a throttle, both of which are disposed in the hydraulic block that forms the pump housing, outside the pump bore and separately from the piston pump.

ADVANTAGES OF THE INVENTION

A throttle which is disposed in the pump outlet is integrated with the piston pump of the invention as defined by the characteristics of claim 1. The throttle preferably hydraulically follows an outlet valve of the piston pump; that is, it is disposed downstream of the outlet valve of the piston pump. By way of example, the throttle, in the form of a baffle, nozzle or other cross-sectional constriction, can be disposed in the pump bore or in an outlet conduit in the pump housing. The throttle serves to damp pressure pulsations of the fluid pumped with the piston pump, which are caused by the piston pump because of its pulsating mode of pumping. Integrating the throttle with the piston pump has the advantage of dispensing with a separate throttle that requires accommodation externally, for instance in a hydraulic block. Another advantage is that a damper chamber downstream of the piston pump, which in known hydraulic vehicle brake systems is considered necessary, can be dispensed with.

Advantageous features and refinements of the invention defined by the main claim are the subject of the dependent claims.

In a preferred feature defined by claim 2, the piston pump of the invention has a bush, which is inserted into the pump bore in the pump housing, and in which the piston is guided axially displaceably. In this feature of the invention, the piston pump furthermore has a closure part, which closes the pump bore in pressure-tight fashion on one face end of the bush. An outlet conduit of the piston pump is formed by a groove, which is made in the closure part and/or in the bush and which either has or forms a narrowed point in order to form the throttle. This feature of the invention has the advantage of not requiring a separate component for the throttle; it enables favorable production of the throttle, and it has the advantage that the throttle occupies no additional space; that is, the throttle is integrated in a space-saving way with the piston pump.

The outlet conduit can be embodied for instance as a radial groove in an end edge of a tubular bush. In FIG. 3, the bush has a bush bottom on a face end toward the closure part. The outlet conduit is formed by a groove which is made in an end face of the bush bottom contacting the closure part and/or in a face of the closure part contacting the bush bottom, and which is covered by the closure part or the bush bottom, respectively. The groove has a narrowed point which forms the throttle.

A relief conduit according to claim 4 has the advantage that in the event of partial or complete clogging of the throttle, the closure part is pressure-relieved. If the throttle is clogged, then fluid pumped with the piston pump and emerging from an outlet hole, surrounded by the relief conduit, in the bush bottom flows into the relief conduit, as long as it passes between the faces contacting one another of the bush bottom and of the closure part, and from the relief conduit it flows past the throttle into the pump outlet downstream of the throttle. The effect of the relief conduit surrounding the outlet hole in the bush bottom is that fluid under pressure acts upon the closure part solely on the face enclosed by the relief conduit; that is, if the throttle is clogged, the stress on the closure part is limited to the fraction of the surface area, contacting the bush bottom, of the closure part that is enclosed by the relief conduit. As a result, clogging of the throttle is prevented from leading to leakage of the closure part in the pump bore or to forcing the closure part out of the pump bore in response to a high pressure on the outlet side of the piston pump resulting from the clogged throttle. This prevents self-destruction of the piston pump.

Producing the bush or the closure part as a formed part (claims 6, 7) has the advantage not only that these parts can be produced economically and quickly but also that the groove, forming the outlet conduit, in the bush bottom and/or in the face of the closure part contacting the bush bottom can be made in a single operation together with the production of the bush or the closure part as applicable. As a result, producing the throttle entails no additional effort or cost.

The piston pump of the invention is intended in particular as a pump in a brake system of a vehicle and is used to control the pressure in wheel brake cylinders. Depending on the type of brake system, the abbreviations ABS (anti-lock brake system), TCS (traction control system), VDC (vehicle dynamics control) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or VDC or EHB). In a brake system with wheel slip control (ABS or TCS) and/or a brake system serving as a steering aid (VDC) and/or an electrohydraulic brake system (EHB), the pump is needed. With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (VDC), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or cylinders if an electric brake pedal sensor detects an actuation of the brake pedal, or in which the pump is used to fill a reservoir of the brake system.

DRAWING

The invention will be described in further detail below in terms of an exemplary embodiment shown in the drawing. Shown are:

FIG. 1, an axial section through a piston pump of the invention; and

Figure 2:
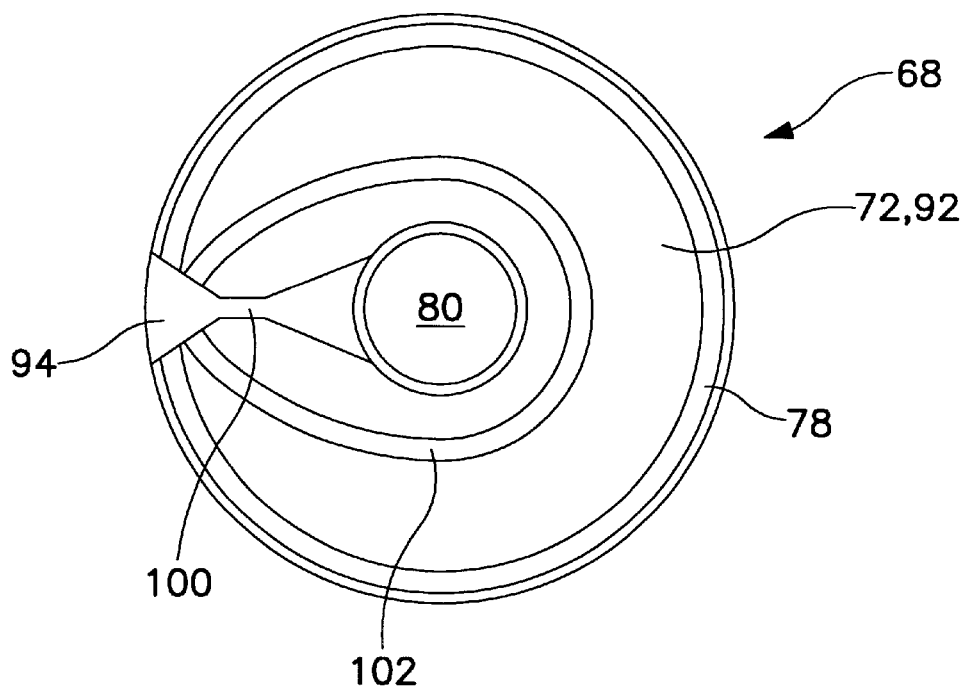

FIG. 2, an end view of a closure part of the piston pump of FIG. 1.

DESCRIPTION OF THE EXEMPLARY EMBODIMENT

The preferred, selected piston pump according to the invention, shown in FIG. 1 and identified overall by reference numeral 10, is inserted into a stepped pump bore 12 which is mounted in a hydraulic block that forms a pump housing 14. The hydraulic block, of which the drawing shows only a fragment surrounding the piston pump 10, is a constituent part of a slip-controlled hydraulic vehicle brake system not otherwise-shown. Besides the piston pump 10, further hydraulic components such as magnet valves or pressure reservoirs are inserted into this block and connected hydraulically with one another and with the piston pump 10 of the invention.

The piston pump 10 has a piston 16, whose one end, remote from a positive displacement chamber 18, is guided with a guide ring 20 in the pump housing 14 and sealed off with a sealing ring 22. Another end of the piston 16, toward the positive displacement chamber 18, is guided with a guide ring 24 in a bush 26 of the piston pump 10 and sealed off with a sealing ring 28. The bush 26 is inserted with a press fit into the pump bore 12 of the pump housing 14. The press fit creates sealing between the inlet and outlet sides, or in other words the low- and high-pressure sides of the piston pump 10.

For the pump inlet, an axial blind bore is made in the piston 16 from a side toward the positive displacement chamber 18, and this side is intersected near its bottom by transverse bores 32. The blind and transverse bores 30, 32 communicate through windows 34 in a circumferential wall 36 of the bush 26 with an inflow bore 38, which is made radially to the piston pump 10 in the hydraulic block that forms the pump housing 14.

On the end of the piston 16 toward the positive displacement chamber, a check valve is made in the form of an inlet valve 40: The inlet valve 40 has a valve ball 42 as a valve closing body, which cooperates with a conical valve seat 44 that is made at an orifice of the blind bore 30 of the piston 16. A helical compression spring as a valve closing spring 46 presses the valve ball 42 against the valve seat 44. The valve ball 42 and valve closing spring 46 are received in a valve cage 48, which is manufactured as a cup-shaped deep-drawn sheet-metal part, with a diameter approximately equivalent to the diameter of the piston 16, and is provided with flow openings 50. The valve cage 48 has an annular step 52, with which it rests on a face end, toward the positive displacement chamber 18, of the piston 16. It has an integral, outward-protruding radial flange 54, against which a helical compression spring in the form of a piston restoring spring 56 presses and in this way retains the valve cage 48 on the piston 16. At the same time, the radial flange 54 retains the guide ring 24 and the sealing ring 28 axially on the piston 16 between itself and a support ring 60 that is braced on an annular shoulder 58 of the piston 16.

The piston restoring spring 56, via the radial flange 54 of the valve cage 58, presses the piston 16 in the axial direction against an eccentric element 62, which can be driven to rotate by an electric motor and which in a manner known per se serves to drive the piston 16 to execute a reciprocating stroke motion.

On a side adjoining the positive displacement chamber 18, the bush 26 has an integral bush bottom 64, in the middle of which a continuous outlet hole 66 of the piston pump 10 is made.

On the side toward the positive displacement chamber, immediately adjacent the bush bottom 64 on the face end, a closure part 68 which has the form of a cylindrical plug is inserted into the pump bore 12; it is secured and sealed off in fluid-tight fashion by a calking 70 of the pump housing 14 in the pump bore 12. At the same time, the closure element 68 keeps the bush 26 in the pump bore 12.

On a face end toward the bush 26, a shallow, preferably cylindrical recess 72 is made in the closure part 68, and the bush 26 is inserted by its end that has the bush bottom 64 into this recess. For fastening the closure part 68 to the bush 26, the bush 26, on its end inserted into the closure part 68, has an outward-protruding radial collar 74, which forms an undercut 76 that is engaged from behind by one edge 78 of the recess 72 in the closure part 68. To cause the edge 78 to engage the undercut 76 from behind, this edge is reshaped radially inward, for instance by crimping. Crimping the circumference at from three to four points suffices for this fastening.

An axial blind bore 80 is made in the closure part 68, on a bottom of the recess 72, and in it a check valve in the form of an outlet valve 82 is accommodated; the outlet valve cooperates with a spherical valve seat 84, which is made at an orifice, toward the closure part 68, of the outlet hole 66 in the bush bottom 64. A valve ball 86 as a valve closing body is inserted into the blind bore 80 of the closure part 68 and is urged against the valve seat 84 by a helical compression spring 88 acting as a valve closing spring.

An outer end face 90 of the bush bottom 64 is flat. With this face, the bush bottom 64 rests on a likewise flat bottom face 92 of the recess 72 in the closure part 68. A radial groove is made in the bottom face 92 and is covered by the bush bottom 64 to form a conduit which forms an outlet conduit 94 of the piston pump 10. The outlet conduit 94 leads from the blind bore 80 of the closure part 68, in which the outlet valve 82 is accommodated, to the outer circumference of the closure part 68; the outlet conduit 94 passes through the edge 78 surrounding the recess 72 of the closure part 68 and opens into an annular conduit 96, which extends around the bush bottom 64 and is surrounded by the pump housing 14, the bush bottom 64, and the closure part 68. An outlet bore 98 is made in the pump housing 14, originating at the annular conduit 96.

FIG. 2 shows an end view on the bottom face 92 of the recess 72 in the closure part 68. As can readily be seen from FIG. 2, the outlet conduit 94 in the bottom face 92 of the recess 72 in the closure part 68 narrows; it has a place of narrowed cross section, which forms a throttle 100 integrated with the piston pump 10.

In addition to the radially extending outlet conduit 94, a further groove is made in the bottom face 92 of the recess 72 in the closure part 68; it forms a relief conduit 102. The relief conduit 102 has an approximately egg-shaped course; it surrounds the blind bore 80 in the closure part 68, in which the outlet valve 82 is accommodated, as well as the outlet hole 66 in the bush bottom 64. On its "pointed" end, the relief conduit 102 opens at both ends radially outside the throttle 100, or in other words discharges downstream of the throttle 100 into the outlet conduit 94. If brake fluid pumped by the piston pump 10 under pressure penetrates between the bottom face 92 of the recess 72 in the closure part 68 and the bush bottom 64 contacting the bottom face 92 in the event of clogging of the throttle 100, then at maximum, a surface area enclosed by the relief conduit 102 is acted upon by the brake fluid under pressure. As soon as the brake fluid reaches the relief conduit 102 at one point, it flows through it, past the throttle 100 into the outlet conduit 94 and from there on through the annular conduit 96 into the outlet bore 98. The relief conduit 102 prevents brake fluid under pressure from acting on the closure part 68 over its entire surface area in the event of clogging of the throttle 100. As a result, failure of the calking 70, which retains the closure part 68 in pressure-tight fashion in the pump bore 12, is also averted. The relief conduit 102 prevents leakage of the closure part 68 in the pump bore 12 or prevents the closure part 68 from being forced out of the pump bore 12 if the throttle 100 is clogged.

The bush 26 is produced in the form of a cold-headed part made of steel; in a single operation with the production of the bush 26, the outlet hole 66 and the valve seat 84 are also made in the bush bottom 64. At most, postmachining of the valve seat 84 is all that is required. In this way, the bush 26 can be produced inexpensively and quickly without metal-cutting machining.

The closure part 68 is made as a cold-headed part of aluminum; the radial groove that forms the outlet conduit 94 together with the throttle 100 and the relief conduit 102 are made in a single operation together with the closure part 68 by cold-heading. Once again this has major cost advantages and saves time in production.

What is claimed is:

1. In a piston pump, having a pump housing that has a pump bore (12) and having a piston (16) that is axially displaceable in the pump bore and can be driven to execute an axially reciprocating stroke motion, the improvement wherein the piston pump (10) has an integrated throttle (100), which is disposed in a pump outlet (94), wherein the piston pump (10) has a bush (26), which is inserted into the pump bore (12) in the pump housing (14), and in which the piston (16) is guided axially displaceably; wherein the piston pump (10) has a closure part (68), which is inserted, closing the pump bore (12) in pressure-tight fashion, into the pump bore (12) on one face end of the bush (26); wherein the piston pump (10) has an outlet conduit (94) between the closure part (68) and the bush (26), which conduit is formed by a groove in the closure part (68) and/or in the bush (26); and wherein the outlet conduit (94) has a narrowed point that forms the throttle (100) of the piston pump (10).

2. The piston pump of claim 1, wherein the bush (26) has a bush bottom (64) on a face end toward the closure part; and wherein the groove forming the outlet conduit (94) is made in a face (92) of the closure part (68) contacting the bush bottom (64) or in a face (90) of the bush bottom (64) contacting the closure part (68).

3. The piston pump of claim 2, wherein the bush bottom (64) is pierced by an outlet hole (66) of the piston pump (10); and wherein the piston pump (10) has a relief conduit (102), which is disposed between the bush bottom (64) and the closure part (68) and is formed by a groove, which is made, surrounding the outlet hole (66) in the bush bottom (64), in the bush bottom (64) or in the closure part (68) and which communicates with a pump outlet (94) in the flow direction downstream of the throttle (100).

4. The piston pump of claim 3, wherein the piston pump (10) has a check valve as an outlet valve (82), which is disposed inside the relief conduit (102) in the closure part (68), and an orifice of the outlet hole (66), toward the closure part (68), is embodied in the bush bottom (64) as a valve seat (84) of the outlet valve (82).

5. The piston pump of claim 1, wherein the bush (26) has a bush bottom (64) on a face end toward the closure part; and wherein the groove forming the outlet conduit (94) is made in a face (92) of the closure part (68) contacting the bush bottom (64) and in a face (90) of the bush bottom (64) contacting the closure part (68).

6. The piston pump of claim 5, wherein the bush bottom (64) is pierced by an outlet hole (66) of the piston pump (10); and wherein the piston pump (10) has a relief conduit (102), which is disposed between the bush bottom (64) and the closure part (68) and is formed by a groove, which is made, surrounding the outlet hole (66) in the bush bottom (64), in either the bush bottom (64) or the closure part (68) and which communicates with a pump outlet (94) in the flow direction downstream of the throttle (100).

7. The piston pump of claim 6, wherein the piston pump (10) has a check valve as an outlet valve (82), which is disposed inside the relief conduit (102) in the closure part (68), and an orifice of the outlet hole (66), toward the closure part (68), is embodied in the bush bottom (64) as a valve seat (84) of the outlet valve (82).

8. The piston pump of claim 5, wherein the bush bottom (64) is pierced by an outlet hole (66) of the piston pump (10); and wherein the piston pump (10) has a relief conduit (102), which is disposed between the bush bottom (64) and the closure part (68) and is formed by a groove, which is made, surrounding the outlet hole (66) in the bush bottom (64), in the bush bottom (64) and in the closure part (68) and which communicates with a pump outlet (94) in the flow direction downstream of the throttle (100).

9. The piston pump of claim 1, wherein the bush (26) is formed as a cold-headed part.

10. The piston pump of claim 1, wherein the closure part (68) is formed as a cold-headed part.

* * * * *